United States Patent [19]

Papayoanou

[11] 4,129,836
[45] Dec. 12, 1978

[54] FREQUENCY STABLE BORON NITRIDE CHANNEL LASER

[75] Inventor: Aristotle Papayoanou, Eatontown, N.J.

[73] Assignee: The United States of America as represented by the Secretary of the Army, Washington, D.C.

[21] Appl. No.: 784,084

[22] Filed: Apr. 4, 1977

[51] Int. Cl.² .............................................. H01S 3/03
[52] U.S. Cl. ........................... 331/94.5 D; 331/94.5 G
[58] Field of Search ................... 331/94.5 G, 94.5 D, 331/94.5 T; 350/96.12, 96.34; 313/221; 330/4.3

[56] References Cited

U.S. PATENT DOCUMENTS

| | | |
|---|---|---|
| 3,659,220 | 4/1972 | Erickson ...................... 331/94.5 D |
| 3,953,113 | 4/1976 | Shull ............................ 331/94.5 D |
| 3,982,204 | 9/1976 | Andringa ..................... 331/94.5 D |
| 3,991,385 | 11/1976 | Fein et al. .................... 331/94.5 T |
| 4,028,578 | 6/1977 | Byrum, Jr. et al. ................ 313/221 |

*Primary Examiner*—William L. Sikes
*Attorney, Agent, or Firm*—Nathan Edelberg; Sheldon Kanars; Bernard Franz

[57] ABSTRACT

A CW waveguide channel gas laser constructed from boron nitride which due to its high thermal conductivity and extremely low thermal expansivity provides increased frequency stability.

9 Claims, 6 Drawing Figures

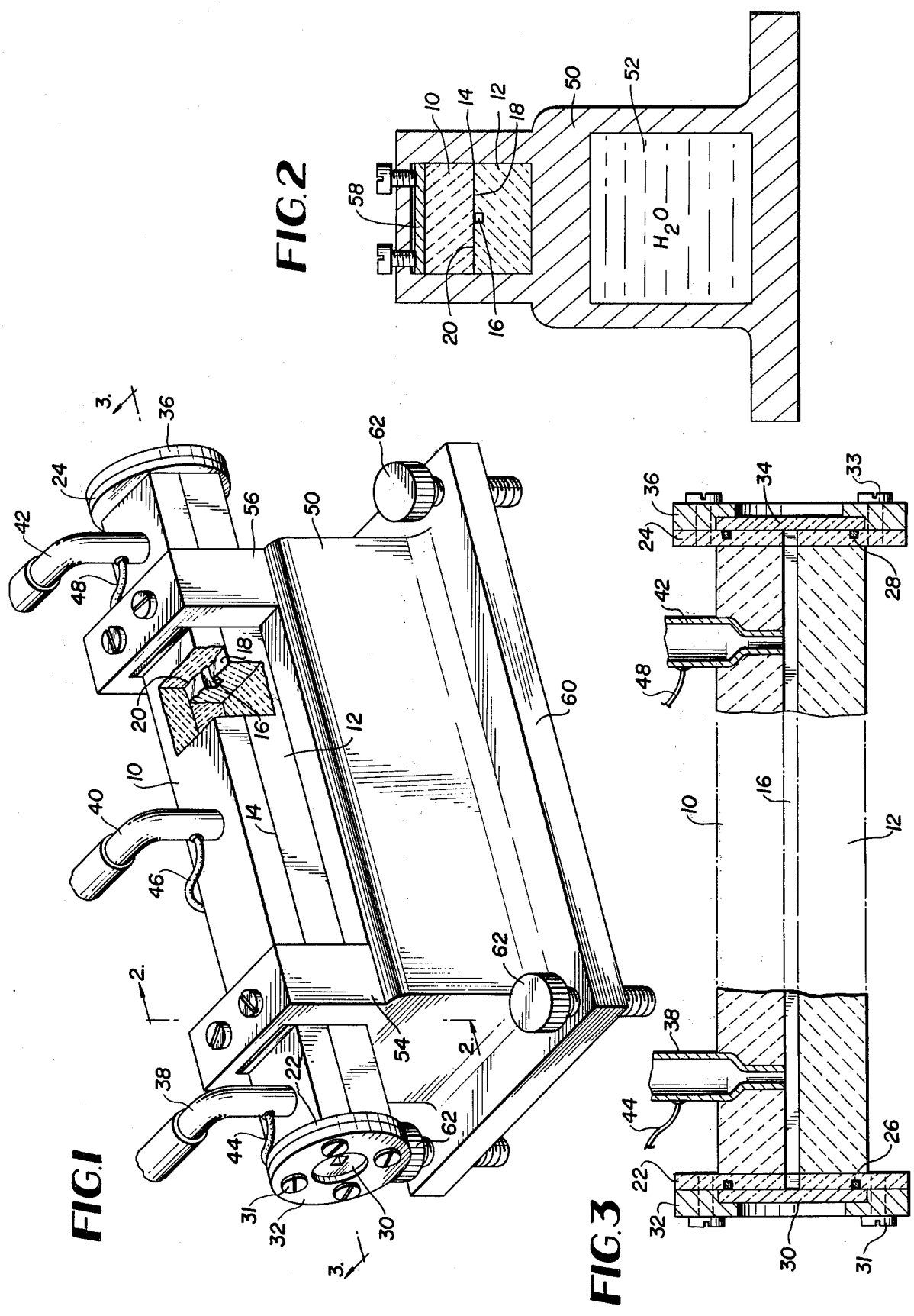

GAIN vs PRESSURE IN BN CHANNEL

MIXTURE He : $CO_2$ : $N_2$ = 80 : 12 : 8
CURRENT 4 mA

P(20) : 10.59 μm

FREQUENCY STABLE BORON NITRIDE CHANNEL LASER

The invention described herein may be manufactured and used by or for the Government for governmental purposes without the payment of any royalties thereon or therefor.

BACKGROUND OF THE INVENTION

1. Field of the Invention

This invention relates generally to the field of gas laser technology, and more particularly to a ceramic waveguide gas laser operated at relatively high pressures.

2. Description of the Prior Art

Thermally stabilized laser apparatus is known to those skilled in the art, typical examples of which are disclosed in U.S. Pat. Nos. 3,699,472, Young; 3,588,737, Chow; and 3,528,206, Baird. Gas laser tubes constructed of mullite, zircon, alumina and beryllia are also disclosed in U.S. Pat. No. 3,492,597, Neusel. Additionally, a glass ceramic chareterized by a zero coefficient of thermal expansion over a broad temperature range has been disclosed in a publication entitled "Laser Components of Cer-Vit" which appeared in the SPIE INFORMER on June, 1971, at page G39.

Discharges in small bore tubes using gases with homogeneously broadened laser transitions obtainable with mixtures of $CO_2$, CO and $N_2O$ permit operation at higher pressures. Pressure broadened optical gain lines are desirable inasmuch as they allow wider frequency tuning of a laser oscillator and they allow small amplitude variations when operating over a relatively wide range of frequencies near gain line center. It is also known that optimum pressures for laser action in wall dominated discharges are inversely proportional to the bore diameter. This makes it desirable to build laser tubes with small bores or channels; however, in constructing such laser systems for optimum operation, certain problems are encountered. First of all, diffraction of the optical beam from the output end of the bore or channel commonly referred to as the "guide" end can lead to large diffractional losses unless curved mirrors are precisely positioned from the guide end to minimize such losses. Alternatively, flat mirrors which terminate the guide end reduce such diffraction losses to nearly zero while greatly improving mechanical stability by making the mirrors integral parts of the optical gain chamber. Secondly, small bores or channels introduce optical absorption losses and losses due to scattering from the wall surfaces. Thirdly, operation of small bore tubes reduces wall surface area. Noting that the optimum pressure is inversely proportional to the bore diameter while the area of the tube varies as the square of the wall diameter, the reduction of the heat transfer area makes heat removal a more serious problem assuming that the electrical input power per unit length remains constant as the tubes are scaled to smaller diameters.

Optical radar and communications systems are known to use gaseous laser transmitters operating near 10 $\mu$m. For such purposes as well as for certain laboratory uses, it is desirable that compact frequency and amplitude stable gas lasers having good beam qualities, high efficiency as well as frequency tunability. Accordingly, mixtures of carbon dioxide ($CO_2$), carbon monoxide (CO) and nitrous oxide ($N_2O$) are utilized. Such lasers, however, operate most efficiently at the lowest possible gas temperatures and include discharge chambers constructed of high thermal conductivity, electrically insulating ceramics which allow for efficient heat transfer. Beryllium oxide (BeO) and alumina ($Al_2O_3$) have heretofore had wide usage since they include these properties. These materials, however, have relatively large thermal expansivities which give rise to thermal frequency variations. Such laser frequency variations are important. They come about when temperature changes cause thermal expansion or contraction of the mirror separation of the laser cavity, causing the Fabry Perot resonance frequency of the mirror cavity to change. It can be shown that the frequency excursion $\Delta f$ of a small laser oscillator due to a temperature change $\Delta T$ is given by the equation:

$$\Delta f = (c/\lambda)\alpha \Delta T \qquad (1)$$

where c is the velocity of light, $\lambda$ is the optical wavelength and $\alpha$ is the thermal expansion coefficient of the laser cavity material. Thus for a given temperature change, the laser frequency change is proportional to the expansivity of the cavity. Accordingly, if one constructs a waveguide laser with flat end mirrors terminating the guide ends, i.e. the bore or channel end which acts to minimize diffraction coupling losses and mechanical frequency fluctuations, then thermal frequency changes become highly significant. For typical operating pressures gains and tube lengths, thermal cavity length changes can cause sufficiently large changes in the Fabry Perot resonance that the laser "jumps" from one optical gain transition line to another. This leads to gross laser frequency and amplitude changes.

SUMMARY

Briefly, the subject invention is directed to an improved ceramic waveguide gas laser wherein the waveguide consists of boron nitride, and more particularly comprises two equal lengths of boron nitride contiguously placed together with one of the lengths including a longitudinal or lengthwise channel formed therein with the contiguous surface of the other length providing the fourth wall of a rectangular laser cavity together with flat end mirrors secured to opposite ends of the slabs. Two or more gas ports including electrode means are coupled to the channel through the boron nitride walls.

BRIEF DESCRIPTION OF THE DRAWINGS

FIG. 1 is a perspective view including a cutaway section of the preferred embodiment of the subject invention;

FIG. 2 is a cross sectional view of the preferred embodiment taken along lines 2—2 of FIG. 1;

FIG. 3 is a longitudinal cross section of the preferred embodiment shown in FIG. 1 taken along the lines 3—3;

DESCRIPTION OF THE PREFERRED EMBODIMENT

Figure 4:
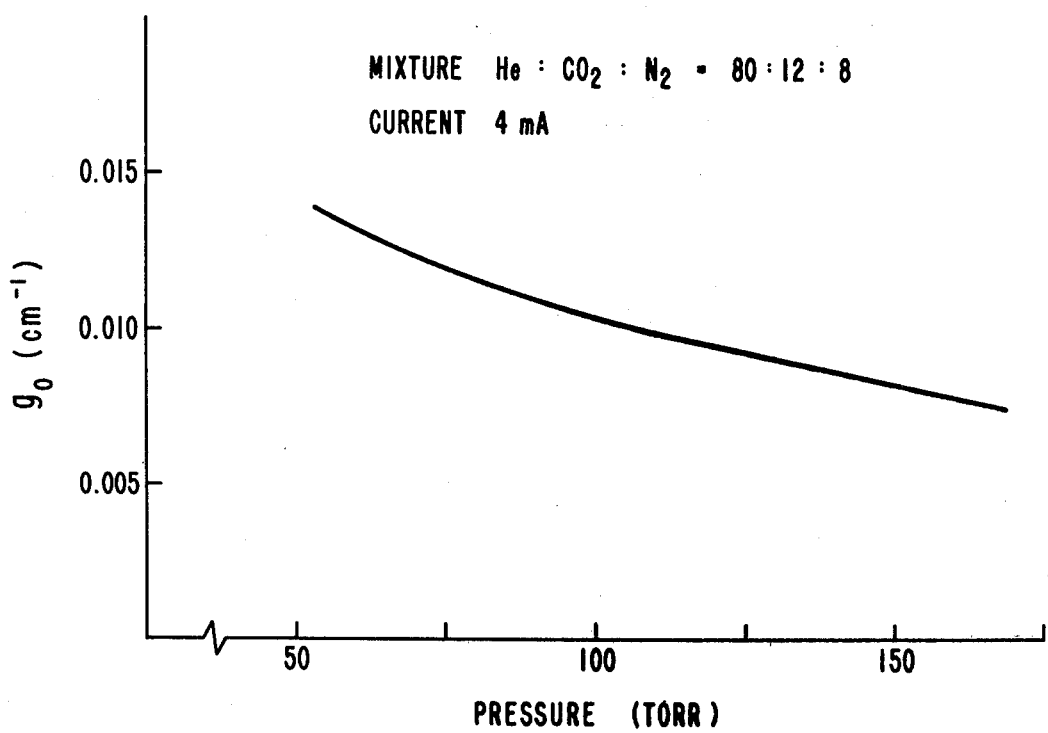
FIG. 4 is a characteristic curve illustrative of the operation of the subject invention.

In order to improve the frequency and amplitude stability in a ceramic channel waveguide laser operating with a gaseous medium, for example a He:CO$_2$:N$_2$ mixture in the ratio of 80:12:8, the present invention contemplates forming the laser cavity from boron nitride (BN) which has the property not only of high thermal conductivity, but is easily and precisely machineable. More importantly, however, boron nitride has a coefficient of expansion in the order of $10^{-7}$/degree C, which is unobtainable in the other known prior art materials. This characteristic has been found to eliminate line "jumps" even for relatively large cavity temperature changes.

Referring now to the preferred embodiment of the subject invention, attention is directed to FIGS. 1–3 collectively, wherein reference numerals 10 and 12 designate two equal length (12 inches) pieces or block members of boron nitride which are contiguously bonded together to share a common flat inner face 14. The thickness of the boron nitride member 10 is slightly less than the thickness of the member 12 by the depth dimension of a lengthwise channel 16, rectangular in cross-section, machined in the upper surface 18 of member 12 along its entire length. It has been found that machining of a channel which is straight to 0.001 inches over the 12 inches length is easily achieved. The lower surface 20 of the member 10 is adapted to form the fourth or upper wall of the channel 16. This type of configuration is resorted to because small bores cannot easily or routinely be made in boron nitride material because ordinary drill bits tend to quickly bind and freeze.

Invar, which is a commercially available low thermal expansion nickel alloy, end flanges are affixed to the boron nitride members 10 and 12 for holding the laser mirrors. More particularly, circular invar flanges 22 and 24 are affixed to the ends of the boron nitride members 10 and 12. A flat germanium mirror 30 is held against a rubber or rubber-like O-ring 26 by an invar retaining ring 32 and invar screws 31. Tightening of the invar screws 31 to the fixed flange portion 26 allows one to provide sufficient tilt to the laser mirror 30 in order that its flat face be perpendicularly aligned to the channel 16. Additionally, such tightening of the screws 31 allows a vacuum tight compression seal to be formed along the junction of the mirror and O-ring. If the mirror 30 is designated the front or output mirror, it is adapted to have a relatively high transmissivity, for example 8%. Accordingly, a highly reflective rear mirror 34 having a reflectivity of 99.5% is located at the other end of the channel. The mirror 34 is placed against the O-ring 28 residing in a groove of the invar flange 24 and held in position by its respective circular retaining ring 36. Invar screws 33 provide the axial tilt and compression in the manner discussed above for mirror 30.

Three metallic tubes 38, 40 and 42 are fitted into the upper boron nitride member 10 to couple the gaseous laser medium to and from the channel 16. The tubes 38 and 42 are located near the ends of the channel 16 while the tube 40 is positioned approximately midway therebetween. Additionally, the metal tubes 38, 40 and 42 are adapted to operate as laser electrodes by the electrical connection of excitation leads 44, 46 and 48 in a manner well known to those skilled in the art and thus provide two discharge sections excited in parallel.

The channel waveguide formed by the boron nitride members 10 and 12 is shown for purposes of illustration in FIGS. 1 and 2 resting on a metallic heat sink 50 comprised of a body of aluminum, for example, adapted to include a water cooled chamber 52. The heat sink 50 additionally includes upwardly extending mounting block portions 54 and 56 which are adapted to include respective screw tightened clamps, one of which is shown in FIG. 2 and identified by reference numeral 58. The base portion 60 of the heat sink body 50 additionally includes leveling screws 62 located at each of the four corners thereof in order to accurately position the output laser beam for certain designated uses, e.g. in a laboratory. It should be pointed out, however, that the body 50 shown in FIGS. 1 and 2 would be replaced by other appropriate heat sink means, not shown, in other installations such as optical radar and communications systems.

Figure 5:
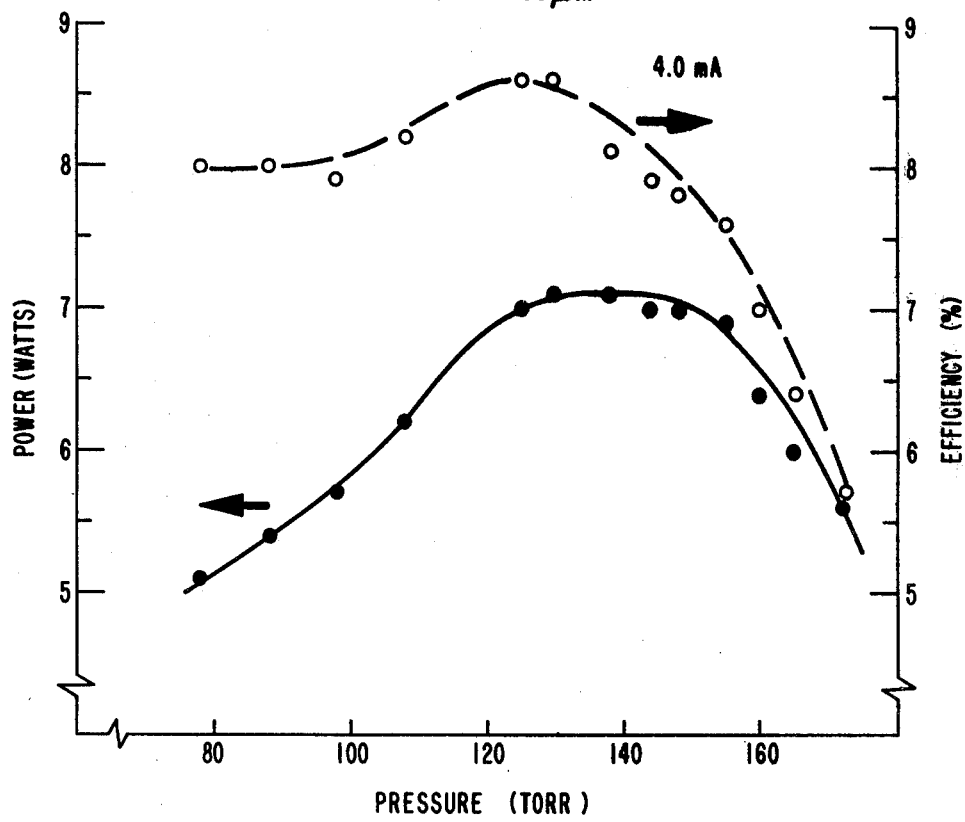
FIG. 5 is a set of curves further illustrative of the operation of the subject invention.
Figure 6:
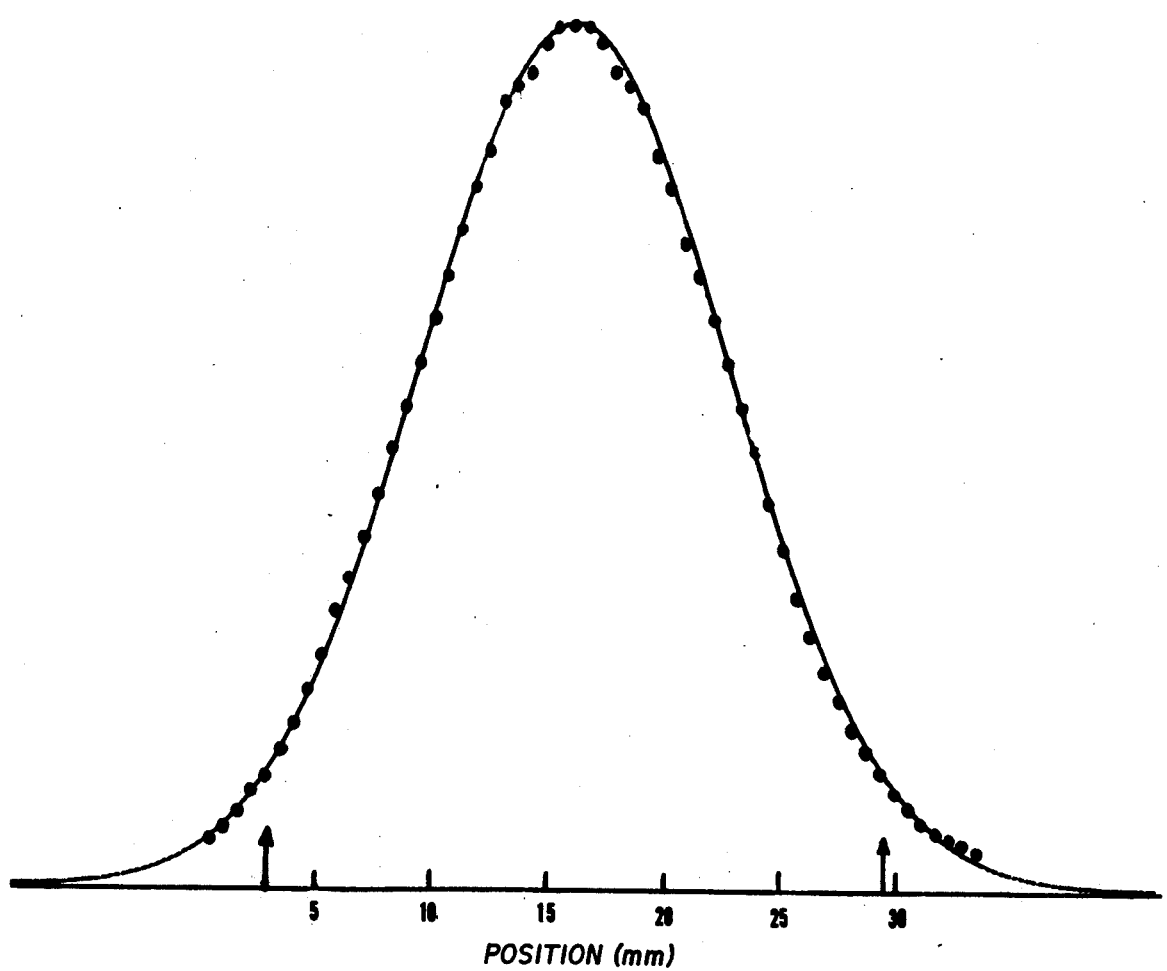
FIG. 6 is a curve illustrative of the radial intensity distribution of a laser constructed according to the present invention shown in FIG. 1.

FIGS. 4, 5 and 6 are characteristic curves derived from an embodiment of the subject invention operated with a 80:12:8 mixture of He:CO$_2$:N$_2$ and where the following typical dimensions for the channel were provided:

Length of boron nitride channel = 30cm (12 inches)
Active discharge lengths (two discharge sections excited in parallel = 12.5cm each.
Channel dimensions = 1.6mm × 1.6mm.
Distance between mirrors = 30.5cm.
Active discharge volume = 0.64cm$^3$
Total channel volume = 0.77cm$^3$.

FIG. 4 is a curve illustrative of the gain vs. pressure in the laser channel for a current of 4 milliampres between the pressure limits of 50 and approximately 170Torr. FIG. 5, on the other hand, discloses two curves which are illustrative of the relationship of output power and efficiency between the same pressure limits. FIG. 6, on the other hand, is a curve of the radial intensity distribution of the output beam from the channel as measured by a pyroelectric detector which was scanned across the laser beam in the far field of the laser. The curve of FIG. 6 indicates that a substantially circular output beam having a Gaussian radial intensity distribution is obtained from a channel which is rectangular in cross-section as shown in FIGS. 1 and 2.

Thus what has been shown and described is an improved, compact, mechanically and thermally stable, frequency tunable laser formed from extremely low thermal expansivity ceramic having precisely and easily machinable channel walls of sufficient straightness and smoothness to maintain low passive laser cavity losses and thereby provide efficient stable laser operation.

Having thus shown and described what is at present considered to be the preferred embodiment of the subject invention, I clam:

1. A tunable high pressure molecular laser comprised of an elongated dielectric waveguide laser cavity of relatively small cross sectional area relative to its length, terminated at each end by a respective end mirror, a laser medium comprising a gaseous mixture, and means to excite said medium to provide laser action;

wherein said laser cavity comprises a channel formed in a block of boron nitride ceramic material which has high thermal conductivity and low thermal expansion, with the channel being the full length of said block and having cross sectional dimensions which are a very small fraction of the corresponding dimensions of said block;

cooling means providing a reservoir for removing heat from said block, which in conjunction with the good thermal conductivity of the boron nitride, acts to maintain the laser at an efficient, low operating temperature;

the construction means and the boron nitride thermal expansion properties being such that the change in mirror separation distance is very small and therefore the Fabry Perot resonance frequency is sufficiently stable to substantially eliminate line jumps.

2. The laser as defined by claim 1 wherein said channel is generally rectangular in cross section.

3. The laser as defined by claim 2 wherein said block consists of a first and a second contiguous piece of boron nitride of equal length and having substantially flat end portions to which said respective end mirrors are positioned.

4. The laser as defined by claim 3 wherein said channel is defined by three side walls in said first piece of boron nitride and the fourth wall is defined by the overlying surface of said second piece of boron nitride.

5. The laser as defined by claim 4 wherein said end mirrors respectively comprise flat mirror elements, one element of which is adapted to partially transmit optical energy out of said cavity while the other element is adapted to reflect optical energy in said cavity to said one element, and the distance of each mirror element from said block is less than three times the width of said channel.

6. The laser as defined by claim 5 wherein said flat mirror elements are positioned adjacent said end portions by means of respective pairs of low thermal expansion retaining rings having resilient gasket means interposed therebetween for providing selective alignment of said mirrors relative to said channel and to provide a vacuum tight compression seal, and the distance of each mirror element from said block is not greater than twice the width of said channel.

7. The laser as defined by claim 6 wherein said gaseous mixture includes carbon dioxide.

8. The laser as defined by claim 7, wherein the pressure of said medium during operation is within the range of 50 to 170 Torr, and operation is at the line P(20) centered at 10.59 micrometers;

wherein the basic structure in which said channel is formed consists only of said block, consisting only of boron nitride, with a major portion of the surface of the block exposed to the ambient atmosphere; there being contact of the block with said cooling means, mounting means holding the block, and a plurality of tubes fitted into the block to couple said medium to and from the channel and to function as electrodes between said end portions.

9. The laser as defined by claim 1 wherein said medium comprises a gaseous mixture in the ratio of 80:12:8 of helium-carbon dioxide:and nitrogen, respectively.

* * * * *